March 26, 1957  H. L. RIESS  2,786,377
PREDETERMINED TORQUE RELEASE HAND TOOL
Filed May 17, 1954  2 Sheets-Sheet 2

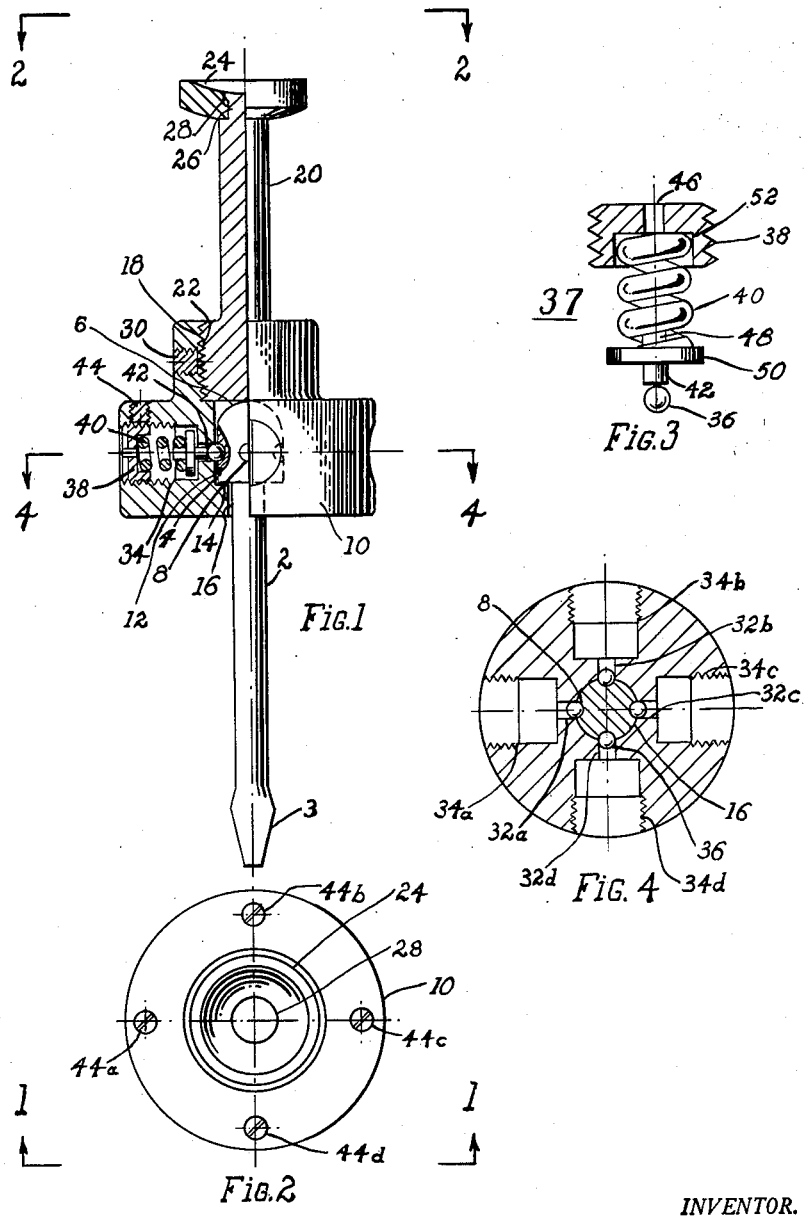

INVENTOR.
Hanley L. Riess
BY Leonard H. King
AGENT

United States Patent Office 2,786,377
Patented Mar. 26, 1957

2,786,377
PREDETERMINED TORQUE RELEASE HAND TOOL

Hanley L. Riess, Glen Oaks, N. Y.

Application May 17, 1954, Serial No. 430,329

11 Claims. (Cl. 81—52.4)

This invention relates to improved torque sensitive clutch mechanisms and in particular but not limited thereto, to tools utilizing the same.

By "torque sensitive clutch mechanism" is meant a coupling means comprising a driving member and a driven member which are normally locked together but which will operate independently when the torque applied to the driven member exceeds a predetermined value.

Typical of the prior art devices are the slip clutch type wherein there is mounted on a rotating shaft a driving member having a face radial to the shaft and which is arranged to rotate with said shaft. A driven member is positioned on a shaft to be rotated. The driven member is provided with a face adapted to mate with the face of the driving member. Spring loading maintains the faces in engagement. As the driving member is rotated the driven member is caused to follow. However, if the rotation of the driven member is restricted, the torque applied may be sufficient to overcome the coefficient of friction between the faces causing slippage to occur.

This type of clutch is limited in application since it is prone to change its "operating" or "torque release point" with wear and glazing of the clutch faces.

Another prior art approach has been to provide mechanically engaged members which are disengaged by the "triggerlike" withdrawal of a locking pin when the torque release point is exceeded. Such devices have in general been limited as to application because of complexity and resulting high cost, weight and size limitations, and frequently the inability to maintain with accuracy the same torque release point after being placed into service. Further, many of the prior art devices are subject to substantial wear during operation and therefore require frequent readjustment and replacement. A feature of this invention is the providing of a simple clutch mechanism utilizing few parts and which is inherently capable of providing long service life as well as accurate engagement and disengagement at predetermined operating points.

Another familiar prior art device is the torque indicating wrenches common to the automotive industry which utilize a spring loaded indicator pointer attached to a wrench so as to permit the operator to determine the torque applied to a bolt being tightened. An obvious disadvantage of this prior type of device is that the degree of tightening is subject to the skill and judgment of the operator.

There is disclosed in this application an improved device which may be set to engage and disengage automatically at predetermined operating points. This feature makes practical power driven tools such as screwdrivers which automatically disengage when the driven screw is properly seated.

The simple rugged construction provided by this invention also permits the manufacture of novel hand tools, such as for example a jeweler's screwdriver, i. e. a small screwdriver suitable for tightening (or loosening) of fine screws such as is used in the horological and instrument industries.

An important advantage of the clutch apparatus disclosed hereinafter, over the prior art, is that it may be embodied in a novel tool which may be adjusted in the field by an unskilled tool operator to release precisely at a selected torque loading. The tool may be a screwdriver, a wrench, or other similar rotary tool.

It is an object of this invention to provide a tool having incorporated a torque-sensitive disengaging clutch mechanism which may be readily adjusted to operate at selected loadings.

A particular object of this invention is to provide an improved clutch having incorporated means for adjustment for operation at a selected level of torque loading.

An object of this invention is to provide an improved clutch mechanism automatically disengageable at a predetermined torque.

It is an object of this invention to provide a tool having incorporated a torque sensitive clutch mechanism which may be readily adjusted by the operator to disengage at a selected loading.

A particular object is to provide a durable torque sensitive clutch mechanism.

An object of this invention is to provide an improved torque sensitive clutch which will maintain a preadjusted setting under operational conditions.

An object of this invention is to provide an adjustable torque sensitive clutch having incorporated a dial to indicate the operating point.

A particular object of this invention is to provide an improved clutch mechanism automatically disengageable at a predetermined torque load and having means to adjust the release point.

An object of this invention is to provide an improved torque sensitive clutch mechanism having incorporated improved lubrication means.

Other objects and advantages of the invention will be pointed out in the following description and claims and illustrated in the accompanying drawings which disclose the principles of the invention and preferred embodiments, and the best mode which has been contemplated for carrying out the invention.

In the drawings:

Fig. 1 is a partially sectioned elevational view of one embodiment of a screwdriver incorporating this invention.

Fig. 2 is an end view taken in plane 2—2 of Fig. 1.

Fig. 3 is a detailed partially sectioned view of an actuator shown in Fig. 1.

Fig. 4 is a sectional view taken in plane 4—4 of Fig. 1.

Figure 7:
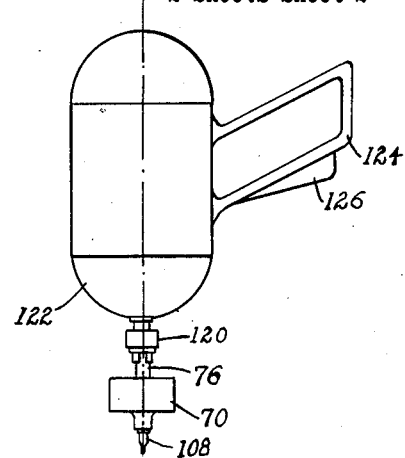
Fig. 7 shows a rotary power tool utilizing a clutch release mechanism.

In Fig. 1, there is disclosed a screwdriver having a torque sensitive clutch incorporated. The screwdriver may be sufficiently small to permit its use for adjusting and assembling delicate instrument and horological devices. A typical unit has an overall length of 5¼" and maximum diameter of 1". It is quite practical to build units half this size.

A steel shank 2 provided with a hardened steel blade 3 is formed integrally with a shaft element 4. Alternatively, the shank 2, blade 3, and shaft 4 may be assembled of separate elements. The shaft 4 is provided with a rounded bearing surface 6 and four recesses 8 uniformly spaced around the periphery of shaft 4. Rotatable housing 10 is provided with a shaft receiving opening comprising a stepped axial shaftway 12. In assembly, the shank 2 is inserted into the shaftway 12 so that shaft 4 rests against shoulder 14. Section 16 of the shaftway is so machined as to provide a close fit with shaft 4, thus serving as a bearing. Section 18 of the housing 10 is internally threaded. A handle member 20 is provided with a threaded end portion 22 adapted to mate with threaded section 18.

The handle member 20 is capped by a finger grip 24 which is permitted to rotate about reduced shaft portion 26. Shaft end 28 is peened so as to retain finger grip 24. Handle 20 is screwed into housing 10 to the extent that axial end play on the part of shaft 4 is eliminated. It is important to allow sufficient play to eliminate binding. Set screw 30 is then tightened to lock the handle 20 so as to prevent further turning of the handle in the threaded section 18.

The top view of the screwdriver is shown in Fig. 2.

A spring loaded ball member 36 in conjunction with recess 32$a$–32$d$ serves as a detent mechanism 37. The detent mechanism is shown in an enlarged view in Fig. 3. In mechanism 37, pin 46 serves to depress ball member 36. Pin 42 in cooperation with ledge 50 retains one end of spring 40, the other end of the spring being held in alignment by the internally formed recess 52 of set screw 38.

Referring now to the cross-sectional view of Fig. 4, there is disclosed radially deployed cylindrical openings 32$a$, 32$b$, 32$c$ and 32$d$ which are provided with coextensive threaded cylindrical cavities 34$a$, 34$b$, 34$c$ and 34$d$ arranged to be axially aligned with recesses 8 and in the same plane taken at right angles to shaft 4.

Each cavity 34$a$, 34$b$, 34$c$ and 34$d$ is provided with a detent mechanism 37. Accordingly, while this description is in terms of the action of one detent mechanism 37, it is to be understood that there is employed in similar fashion other detent mechanisms.

Set screw 38 adjusts the compression of spring 40 which in turn causes actuating guide 42 to depress ball member 36. Set screw 38 is locked in position by interference of radially deployed locking screw 44.

An orifice 46 is provided in set screw 38 to permit lubrication. This feature of the invention provides a lubrication means which is simple, convenient and yet inexpensive to manufacture. The orifice may be formed automatically on a screw machine together with recess 52.

Figure 5:
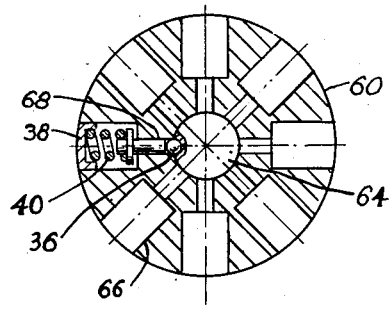
Fig. 5 shows in horizontal cross-section an element for use in a high torque embodiment of this invention.

The clutch mechanism of this invention is designed to operate within particular torque ranges. For a given set of springs the torque release setting may be varied by adjusting the tension on each spring 40 by means of set screw 38. If it is desired to set the mechanism to release only under heavy loading, it would appear that stiffer springs need be utilized. However, there is a practical limit to the spring stiffness permissible. A solution is provided by an alternative embodiment wherein a larger number of detent mechanisms 37 are utilized. Referring to Fig. 4 it may be seen that there is no room for additional detent mechanisms 37. A feature of this invention is to provide an elongated actuating piston 68 as shown in Fig. 5. The longer actuating piston makes practical the positioning of the detent mechanism spring 40 and ledge member 50 along the outer periphery of housing 60, its length being at least twice its diameter.

Referring to Fig. 5 it may be seen that a maximum number of ball members 36 may be positioned circumferentially about the shaftway 64 by the use of the longer actuating piston.

Again while the action of but one detent mechanism 37 is discussed, it is to be understood that each cavity 66 is similarly provided with a detent mechanism 37.

This high torque embodiment is particularly useful for heavy duty clutch mechanisms such as used, for example, in the power train of motor driven machinery.

A screwdriver such as is shown in Fig. 1 is useful for use in applications wherein the tool may be preset by the toolroom attendant for a particular setting. A typical application of this device is for use on an assembly line where the corresponding screws of successive units are assigned to a particular operator for tightening.

For use in applications requiring a range of torque settings there is a need for a tool which may be readily reset to different operating points by the operator. Whereas a toolroom may be equipped with master gauges for setting the torque release point, the adjustable tool need be provided with built-in indices.

Figure 6:
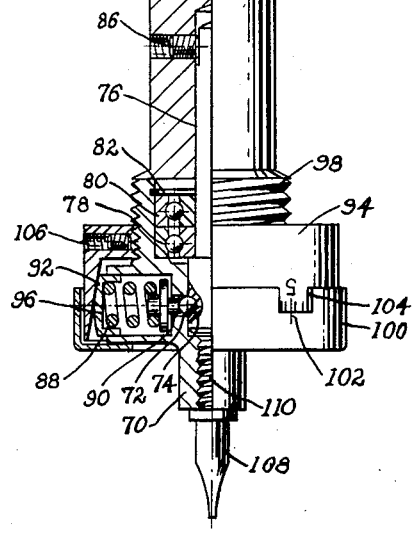
Fig. 6 shows in elevation a partially sectioned tool incorporating an adjustable clutch mechanism of this invention.

In Fig. 6 there is shown an adjustable tool. Housing 70 contains spring loaded ball members 72 which are positioned in recesses 74 of shaft 76. The shaft 76 and housing 70 will rotate together in the absence of a torque loading greater than the release point selected. Shaft 76 is mounted in the housing by means of two ball bearing races 78 and 80 which serve as a self-aligning means. The bearing races 78 and 80 are locked in the housing 70 by means of an expandable lock ring 82. In turn shaft 76 is captured by bearing 78. Handle 84 is fastened to shaft 76 by means of set screw 86. Ball member 72 is depressed by spring 88 and actuator 90. Chamber 92 is not threaded as was the cavity 34 shown in Fig. 1. The spring 88 is loaded by the pressure of tapered portion 92 of collar 94 against piston 96. Collar 94 may be moved along housing 70 by means of thread 98. Sleeve 100 is provided with an index mark 102. Scale 104 is inscribed in housing 70. The scale may be calibrated in inch pounds. Set screw 106 is used to lock the collar 94 with respect to housing 70 if it is desired to maintain a given setting. Screwdriver blade 108 is secured in housing 70 by means of threaded portion 110.

In place of handle 84 shaft 76 may be locked in chuck 120 of the motor driven tool 122 of Fig. 7. Handle 124 is provided with a control switch, not shown, actuated by trigger 126. The tool may be electrically or compressed-air powered.

Figure 8:
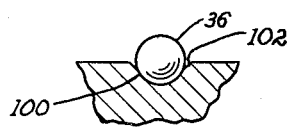
Fig. 8 shows in detail a ball receiving detent.

It has been found that the ball member receiving recess 8 should be provided with a tapered contour in order to minimize change in performance characteristics with use as a result of wear. A preferred contour is shown in Fig. 8 wherein recess 100 is provided with slightly tapered walls 102. The depth of the recess should be approximately 50% of the diameter of the ball member used.

A preferred method of forming the hole is by drilling the recess to the proper depth with a ball-shaped drill and then counterboring the crown of the hole with a counterbore having an angle of approximately 90°.

In describing the clutch mechanism the shaft has been considered the driven element, and the coaxial housing the driving element. It is to be understood that the coaxial housing may be employed as the driven member and the shaft as the driving member.

Having thus fully described my invention and the best mode in which I contemplate applying those principles so as to distinguish my invention from other inventions, and having particularly pointed out and distinctly claimed the part, improvement, or combination which I claim as my invention, and having shown and described certain preferred embodiments of my invention, it will be understood that modifications and changes may be made without departing from the spirit and scope of my invention, as will be clear to those skilled in the art.

What I claim is:

1. An adjustable torque sensitive clutch comprising, a plurality of ball members, a rotatable shaft provided with a plurality of recesses along its circumference adapted to partially receive said ball members, a rotatable housing coaxial with said shaft provided with a plurality of openings arranged in radial alignment with said recesses, one of said ball members being located in each of said openings and adapted to engage in said recesses, an actuator member adapted to slide in each of said openings in contact with each said ball member, a plurality of springs, one of said plurality of springs being positioned in contact with each said actuator member and means to simultaneously vary the compression of said plurality of springs against said actuator members, means to maintain said actuator members and recesses in a common plane, and means for indicating the torque release setting of said clutch.

2. An adjustable torque sensitive clutch comprising, a plurality of ball members, a rotatable shaft provided with a plurality of recesses along its circumference adapted to partially receive said ball members, a rotatable housing coaxial with said shaft provided with a plurality of cylindrical openings arranged in radial alignment with said recesses, one of said ball members being located in each of said cylindrical openings and adapted to engage in said recesses, an actuator member adapted to slide in each of said cylindrical openings in contact with each said ball member, a plurality of pistons, one of said plurality of pistons being partially inserted in each of said cylindrical openings and adapted to slide therein, a spring compressed between each said piston and each said actuator member, means to maintain said recesses and said actuator members in the same plane, and means to simultaneously vary the position of said pistons in said cylindrical openings so as to vary the compression of said springs.

3. An adjustable torque sensitive clutch comprising, a plurality of ball members, a rotatable shaft provided with a plurality of recesses along its circumference adapted to partially receive said ball members, a rotatable housing coaxial with said shaft provided with a plurality of cylindrical openings arranged in radial alignment with said recesses, one of said ball members being located in each of said cylindrical openings and adapted to engage in said recesses, an actuator member adapted to slide in each of said cylindrical openings in contact with each said ball member, a piston partially inserted in each of said cylindrical openings and adapted to slide therein, a spring compressed between said piston and said actuator member, means to maintain said recesses and said actuator member in the same plane, a cylinder having a tapered inner face coaxially positioned with respect to said housing, and means to vary the axial position of said tapered cylinder so as to simultaneously vary the position of said pistons in said cylindrical openings and the compression of said springs.

4. An adjustable torque sensitive clutch comprising, a plurality of ball members, a rotatable shaft provided with a plurality of recesses along its circumference adapted to partially receive said ball members, a rotatable housing coaxial with said shaft provided with a plurality of cylindrical openings arranged in radial alignment with said recesses, one of said ball members being located in each of said cylindrical openings and adapted to engage in said recesses, an actuator member adapted to slide in each of said cylindrical openings in contact with each said ball member, a piston partially inserted in each of said cylindrical openings and adapted to slide therein, a spring compressed between said piston and said actuator, means to maintain said actuator members and recesses in a common plane, a torque adjusting cylinder having a tapered inner face coaxially positioned with respect to said housing, means to vary the axial position of said tapered cylinder so as to simultaneously vary the position of said pistons in said cylindrical openings, and an indexing means for indicating the torque release setting of said clutch.

5. The clutch of claim 4 wherein said indexing means comprises a scale marked upon the outer surface of said torque adjusting cylinder and a reference mark.

6. The clutch of claim 4 wherein said indexing means comprises a scale marked upon the outer surface of said torque adjusting cylinder, a cover affixed to said housing including a thin cylinder coaxial with said tapered cylinder and adapted to partially cover same and a reference mark on said housing.

7. An adjustable torque sensitive clutch comprising, a plurality of ball members, a rotatable shaft provided with a plurality of recesses along its circumference adapted to partially receive said ball members, a rotatable housing coaxial with said shaft provided with a plurality of cylindrical openings arranged in radial alignment with said recesses, one of said ball members being located in each of said cylindrical openings and adapted to engage in said recesses, an actuator member adapted to slide in each of said cylindrical openings in contact with each said ball member, a piston provided with a spring receiving cavity partially inserted in each of said cylindrical openings and adapted to slide therein, a spring partially inserted in said pocket compressed between said piston and said actuator member, means to maintain said recesses and said actuator member in the same plane, a cylinder having a tapered inner face coaxially positioned with respect to said housing, means to vary the axial position of said tapered cylinder so as to simultaneously vary the position of said pistons in said cylindrical openings and the compression of said springs, and means to lock said tapered cylinder in a fixed position.

8. An adjustable torque sensitive tool comprising, a plurality of ball members, a rotatable shaft provided with a plurality of recesses along its circumference adapted to partially receive said ball members, a rotatable housing coaxial with said shaft provided with a plurality of cylindrical openings arranged in radial alignment with said recesses, one of said ball members being located in each of said cylindrical openings and adapted to engage in said recesses, an actuator member adapted to slide in each of said cylindrical openings in contact with each said ball member, a piston partially inserted in each of said cylindrical openings and adapted to slide therein, a spring compressed between said piston and said actuator member, means to maintain said actuator members and recesses in a common plane, a torque adjusting cylinder having a tapered inner face coaxially positioned with respect to said housing, means to simultaneously vary the axial position of said tapered cylinder so as to vary the position of said pistons in said cylindrical openings, means for affixing a tool to said housing, and an indexing means for indicating the torque release setting of said tool.

9. An adjustable torque screwdriver comprising, a plurality of ball members, a rotatable shaft provided with a plurality of recesses along its circumference adapted to partially receive said ball members, a rotatable housing coaxial with said shaft provided with a plurality of cylindrical openings arranged in radial alignment with said recesses, one of said ball members being located in each of said cylindrical openings and adapted to engage in said recesses, an actuator member adapted to slide in each of said cylindrical openings in contact with each said ball member, a piston partially inserted in each of said cylindrical openings and adapted to slide therein, a spring compressed between said piston and said actuator member, means to maintain said actuator members and recesses in a common plane, a torque adjusting cylinder having a tapered inner face coaxially positioned with respect to said housing, means to simultaneously vary the axial position of said tapered cylinder so as to vary the position of said pistons in said cylindrical openings, a screwdriver affixed to said housing, and an indexing means for indicating the torque release setting of said screwdriver.

10. An adjustable torque sensitive rotary clutch comprising, a plurality of ball members, a rotatable shaft provided with a plurality of recesses along its circumference adapted to partially receive said ball members, a rotatable housing coaxial with said shaft provided with a plurality of cylindrical openings arranged in radial alignment with said recesses, one of said ball members being located in each of said cylindrical openings and adapted to engage in said recesses, an actuator member adapted to slide in said cylindrical openings in contact with each said ball member, a piston provided with a rounded end configuration partially inserted in each of said cylindrical openings, so as to expose said rounded end, a spring compressed between said piston and said actuator member, means to maintain said recesses in the same plane, and means to simultaneously vary the position of said pistons in said cylindrical openings.

11. The clutch mechanism of claim 10 wherein said actuator members has a length of at least twice its diameter.

References Cited in the file of this patent

UNITED STATES PATENTS

| | | |
|---|---|---|
| 445,615 | Rathbun | Feb. 3, 1891 |
| 998,615 | Huneke | July 25, 1911 |
| 2,038,466 | Yates | Apr. 21, 1936 |
| 2,106,319 | Federighi | Jan. 25, 1938 |
| 2,164,870 | De Salardi | July 4, 1939 |
| 2,238,583 | Dodge | Apr. 15, 1941 |
| 2,601,044 | Mayer | June 17, 1952 |

FOREIGN PATENTS

| | | |
|---|---|---|
| 352,005 | Italy | Aug. 31, 1937 |